United States Patent [19]

Kliman

[11] 4,363,988

[45] Dec. 14, 1982

[54] INDUCTION DISK MOTOR WITH METAL TAPE COMPONENTS

[75] Inventor: Gerald B. Kliman, Schenectady, N.Y.

[73] Assignee: General Electric Company, Schenectady, N.Y.

[21] Appl. No.: 196,456

[22] Filed: Oct. 14, 1980

Related U.S. Application Data

[63] Continuation-in-part of Ser. No. 914,443, Jun. 12, 1978, abandoned.

[51] Int. Cl.³ .............................................. H02K 1/22
[52] U.S. Cl. ..................................... 310/268; 310/216
[58] Field of Search ............... 310/268, 216, 217, 218, 310/193

[56] References Cited

U.S. PATENT DOCUMENTS

| | | | |
|---|---|---|---|
| 1,605,796 | 11/1926 | Tanzler | 310/268 X |
| 2,356,972 | 8/1944 | Chubbuck | 310/268 X |
| 2,550,571 | 4/1951 | Litman | 310/268 X |
| 2,758,231 | 8/1956 | Welter | 310/268 |
| 3,048,723 | 8/1962 | Watson | 310/268 X |
| 3,061,750 | 10/1962 | Stegman | 310/268 |
| 3,069,577 | 12/1962 | Lee | 310/268 X |
| 4,081,298 | 3/1968 | Mendelsohn et al. | 148/121 |

Primary Examiner—Donovan F. Duggan
Attorney, Agent, or Firm—Marvin Snyder; James C. Davis, Jr.

[57] ABSTRACT

An induction motor of the squirrel cage type is disclosed. The stator body and rotor body of the motor are each disclosed as being made of a coil of concentric layers of a thin metal tape which is slotted to receive the rotor and stator windings. The motor is similar to a conventional disk type motor except that the secondary, instead of being a solid copper or aluminum disk, is a coil of concentric turns of notched metal tape which improves the efficiency by reducing the effective air gap. A method of manufacture of the coil of tape is disclosed wherein identical notches are formed in the tape with a progressively increasing spacing between the notches which permits the notches to come into radial register with one another to form a slot in the end of the stator or rotor body.

6 Claims, 15 Drawing Figures

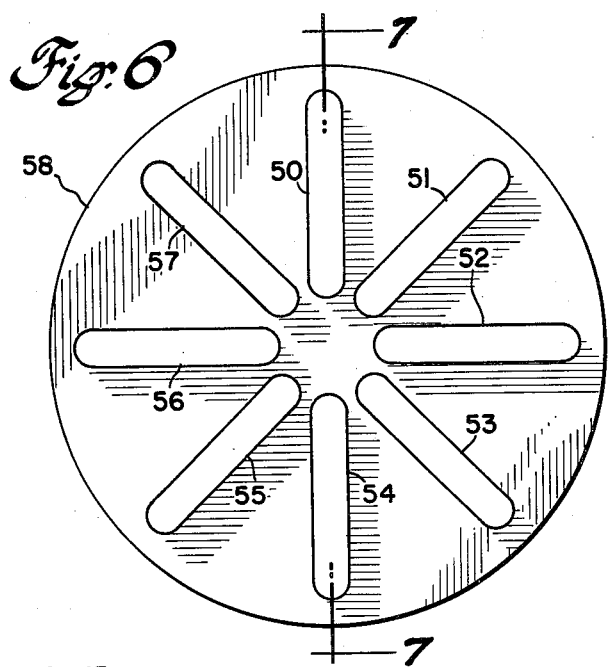
Fig. 6
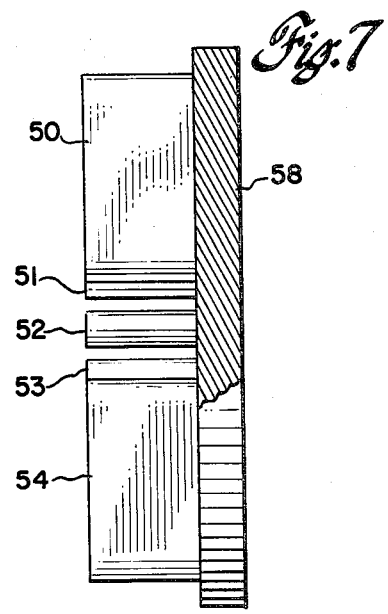
Fig. 7
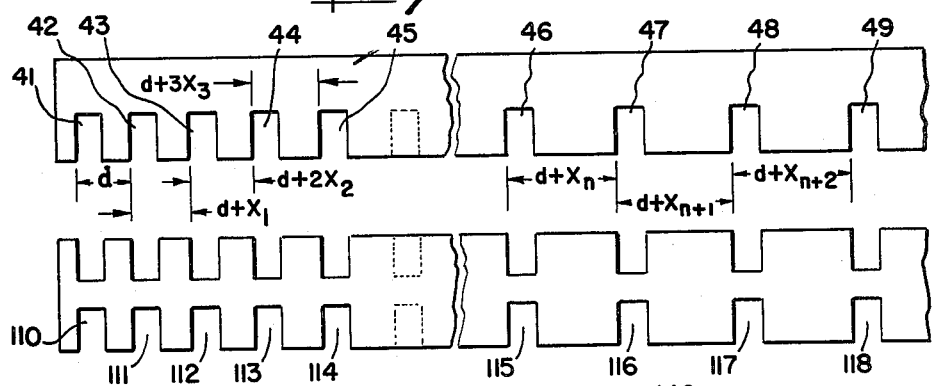
Fig. 8
Fig. 14
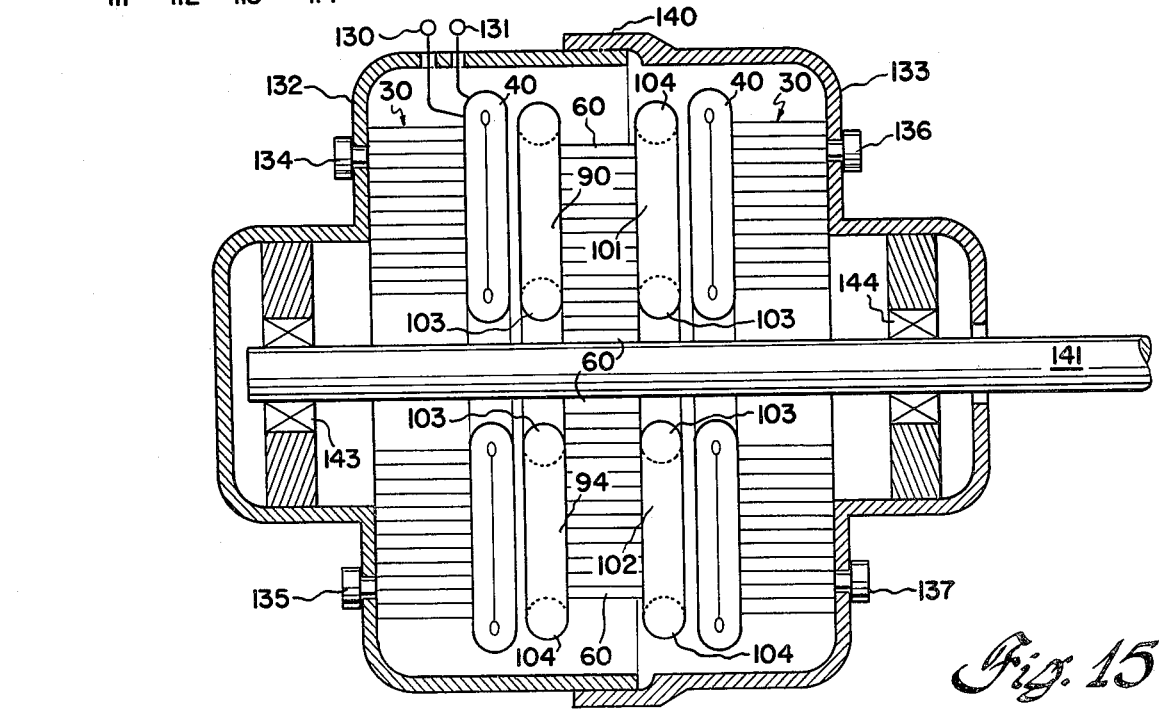
Fig. 15

INDUCTION DISK MOTOR WITH METAL TAPE COMPONENTS

RELATED APPLICATIONS

This application is a continuation-in-part of Application Ser. No. 914,443, filed June 12, 1978, now abandoned.

This application is also related to: Application Ser. No. 914,190 filed June 12, 1978 in the name of Thomas Anthony Lipo, entitled "Salient Pole Configuration For Use As A Reluctance Motor Employing Amorphous Metal" and now abandoned;

Application Ser. No. 914,194, filed June 12, 1978, in the names of Vernon Bertram Honsinger and Russell Edward Tompkins, entitled "Slotless Motor Design Using Amorphous Metal";

Application Ser. No. 914,446, filed June 12, 1978, in the names of Vernon Bertram Honsinger and Russell Edward Tompkins, entitled "Stator Design for Induction and Hysteresis Motors Using Amorphous Metal Tape" and now abandoned;

Application Ser. No. 914,445, filed June 12, 1978, now U.S. Pat. No. 4,286,188, in the names of Vernon Bertram Honsinger and Russell Edward Tompkins, entitled "Amorphous Metal Hysteresis Motor"; and Application Ser. No. 914,190, filed concurrently herewith in the names of Gerald Burt Kliman and Allan Barr Plunkett, entitled "Synchronous Disk Motor With Amorphous Metal Stator and Permanent Magnet Rotor and Flywheel", all of which are assigned to the instant assignee.

BACKGROUND OF THE INVENTION

This invention relates to electric machines, and more specifically to an induction disk motor using a ferromagnetic metal tape for making one or both of the stator body and rotor body of the machine. The metal tape may be amorphous metal or thin silicon or carbon steel.

Induction disk motors are well known and are commonly used in industrial applications. D-C disk motors have been developed for industrial and electric vehicle drives but have numerous known limitations. Induction disk motors with solid rotors are limited in efficiency due to their large effective air gap unconstrained current path and iron core losses.

A squirrel cage induction motor would be very useful for applications such as the wheel motor of an electric car in view of the motor ruggedness, reliability and efficiency; however, these motors are difficult to apply to the disk form which would be preferable in such applications.

Amorphous metal tape having excellent magnetic properties have recently become available at about one-fourth the cost of conventional transformer steel used in electric machines. These tapes exhibit a core loss about one-fourth that of the conventional silicon iron and have very high permeability. Amorphous metal tapes, however, are not available in the usual lamination form now needed for the construction of conventional electric machines so that the desirable magnetic properties and low cost of the amorphous metal glass has not been used for an electric machine. The tape is made very thin (of from 0.0005 to 0.003 inch thick) and in widths of up to about two inches and has high resistivity resulting in superior high frequency properties. Good efficiency is then attainable even at high speeds.

Amorphous metal tapes having magnetic properties desired for application to electric machines are disclosed in U.S. Pat. Nos. 3,856,513, dated Dec. 24, 1974, in the name of Chen et al.; 3,881,542, dated May 6, 1975, in the name of Polk et al.; 4,052,201, dated Oct. 4, 1977, in the name of Polk et al.; 4,059,441, dated Nov. 22, 1977, in the name of Ray et al. and 4,067,732, dated Jan. 10, 1978, in the name of Ray. A survey of metal glass technology is given in the article "Metallic Glasses" by John J. Gilman appearing in *Physics Today*, May 1975, pages 46 to 53. Some attempts are being made to exploit the advantages of the properties of these metal tapes, for example, for acoustic devices as shown in U.S. Pat. No. 3,838,365.

As an alternative to amorphous metal tape, thin strip comprised of silicon steel, such as Armco M22, or as another alternative, "common iron" may be employed.

An object of the present invention is to provide an electric machine construction which capitalizes on the tape form of amorphous metal, silicon steel, or carbon steel, and changes the shape and electromagnetic configuration of the electric machine so that it can utilize the tape.

BRIEF DESCRIPTION OF THE INVENTION

In accordance with the invention, an induction motor of the squirrel cage type is formed using cylindrically wound metal tapes for both the stator body and rotor body. The rotor is provided with a squirrel cage type of winding which is formed in slots in the end faces of the wound annulus which forms the rotor body. The end faces of the rotor body are magnetically coupled through a short axial air gap to two stators which are disposed on either side of the rotor. Each of the stators is similarly formed of a wound coil of metal tape material, and slots are formed in the faces of the stator bodies confronting the rotor body. Suitable stator windings are formed in these slots.

This construction then forms a squirrel cage disk type motor having direct application, for example, to individual wheel drive electric vehicles while avoiding the low efficiency due to the large air gap, unfavorable lamination orientation, solid conductor rotor construction and core losses of prior art disk motors. By contrast, the motor of the present invention has a small air gap, squirrel cage type construction and low loss iron, so that high efficiencies are obtained.

The use of the metal tape also solves the problem existing in the disk type motor whereby conventional laminations cannot be aligned in the proper direction for minimum core loss and maximum effectiveness. By using metal tape which is wound in a coil, the flux in the stator and rotor bodies flows in the longitudinal direction of the tape for minimum core loss and maximum effectiveness.

In the conventional lamination structure, the stator slots must be machined into the laminations which is an expensive operation and leads to higher core losses due to smearing (i.e., electrical connection of adjacent laminations through cold-welding of the burrs). As a further feature of the invention, the tape which is wound to form the rotor and stator bodies may be notched at one or both edges with identical notches having an increasing spacing from one to the next so that, when the tape is wound into a spiral form, the notches of overlying convolutions of the tape will automatically align with one another to define the radial slots needed for the windings of the stator and rotor bodies.

BRIEF DESCRIPTION OF THE DRAWINGS

FIG. 6 shows a winding jig which can be used to assist in the winding of prepunched tape to the form of the coil shown in FIG. 3.

FIG. 7 is a cross-sectional view of FIG. 6 taken across the section line 7—7 in FIG. 6.

FIG. 8 is a top view of a section of the elongated metal tape which is used to form the stator body of FIGS. 1 to 5 and shows prepunched identical notches in the tape which have an increasing separation from one another and which can be wound on the tool of FIGS. 6 and 7.

FIG. 14 shows an elongated length of prenotched tape which can be used to make the rotor body of FIGS. 9 to 13.

FIG. 15 is a cross-sectional view of an assembly using two of the motor stators shown in FIGS. 1 to 5 with an interposed rotor of the type shown in FIGS. 9 to 14 to define a small air gap machine of a general disk motor form with a squirrel cage type construction.

DETAILED DESCRIPTION OF THE DRAWINGS

Figure 1:
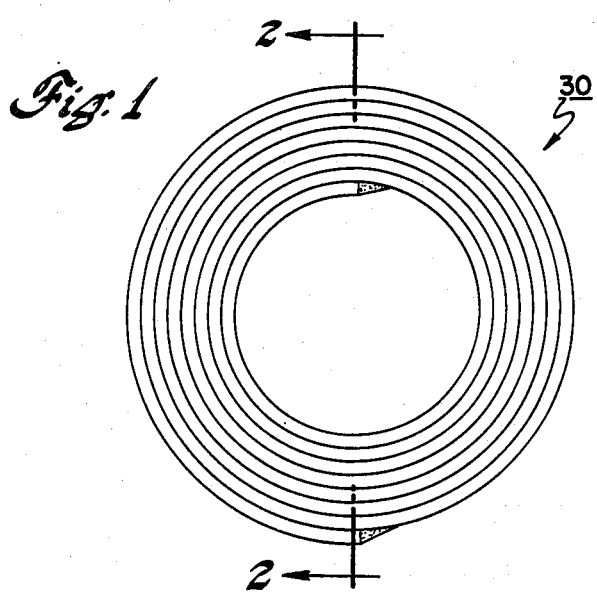
FIG. 1 is an elevation view of a coil of spirally wound metal tape which will be used for the stator body of the motor.
Figure 2:
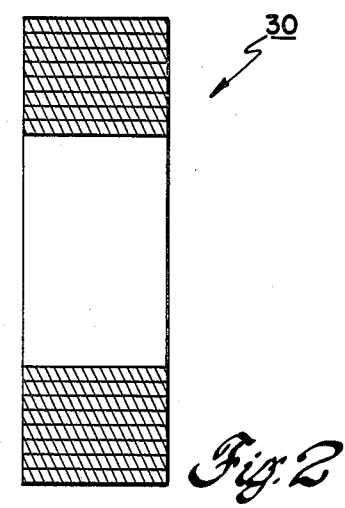
FIG. 2 is a cross-sectional view of FIG. 1 taken across the section line 2—2 in FIG. 1.

Referring first to FIGS. 1 and 2, there is illustrated therein, for a typical small motor application, an annular coil 30 of metal tape in the form of a spiral or convolution. The tape may be comprised of amorphous metal and have a thickness, for example, of 0.002 inch and width, for example, of 1 inch. The winding can have several thousand layers to define a radial thickness of several inches. The amorphous metal tape forming coil 30 may have a composition of $Fe_{80}B_{20}$, such as Allied Metglas ® 2605, or other of the available formulations.

Figure 3:
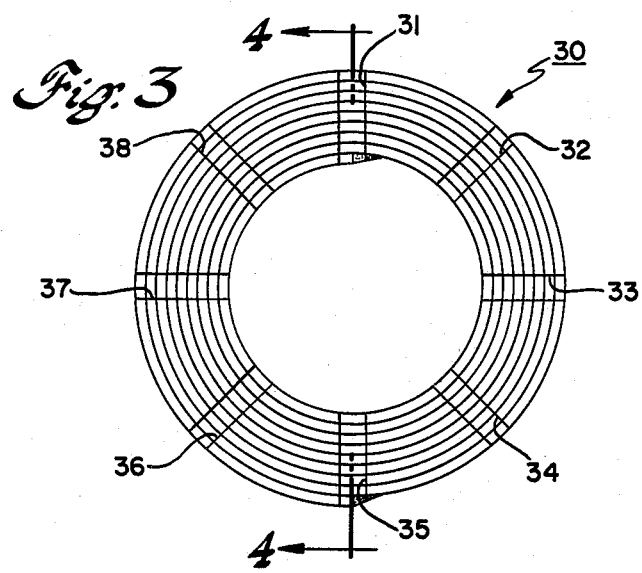
FIG. 3 is an elevation view of the stator body of FIGS. 1 and 2 after slots have been formed in one end of the stator body.
Figure 4:
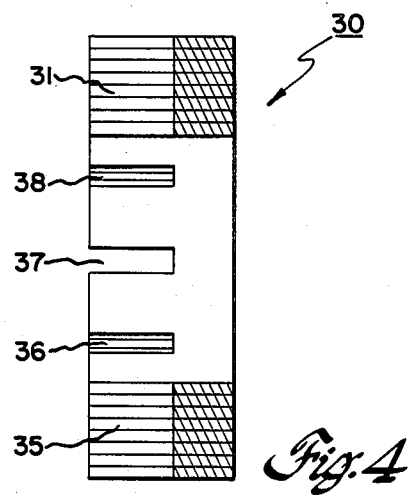
FIG. 4 is a cross-sectional view of FIG. 3 taken across the section line 4—4 in FIG. 3.

The inner and outer ends of the tape can, after being wound into a coil, be secured to their adjacent outer and inner layers, respectively, as by cementing or the like. After the coil 30 is wound, it is slotted by any desired slotting mechanism with any desired number of equally spaced slots depending on the size and number of poles for the machine. In the small motor example given herein, eight slots 31 to 38 are used, as shown in FIG. 3. These slots may have a depth of about 2 inches and a width of about 0.25 inch. Of course, for motors of larger or smaller sizes, the dimensions of coil 30 would be different.

While the slots can be machined after the cylinder 30 is wound, it is also possible to form notches in the tape prior to the winding of the tape as will be described more fully hereinafter.

Figure 5:
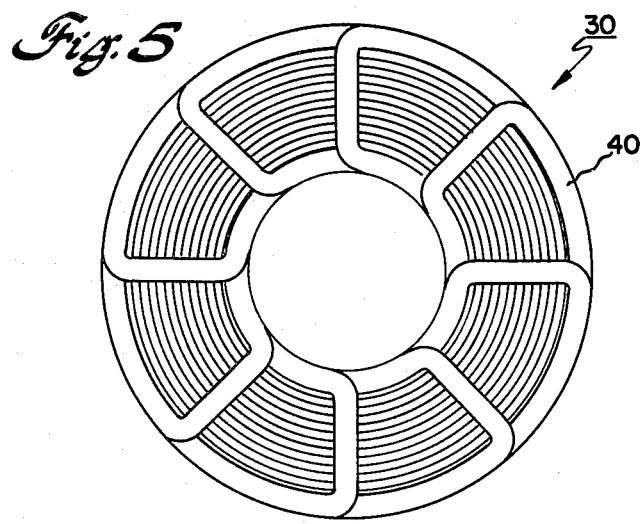
FIG. 5 is an elevation view of the stator body of FIG. 3 after a radially arranged winding is placed in the slots of the stator body to define the stator winding of the machine to be formed.

A suitable stator winding 40, shown in FIG. 5, is then placed in the slots 31 to 38, where the winding 40 may be of the type which produces an azimuthal travelling wave of magnetomotive force as in a conventional single or multiphase motor, except that the windings are radial instead of axial.

The stator construction can then be used in any desired motor configuration by itself or can be used in combination with the particular disk type motor which will be later described.

One method for forming the slotted body shown in FIG. 3 without need for machining a wound annulus as in FIG. 1 is to prenotch the tape as shown in FIG. 8 for the case of notches 41 to 49. Notches 41 to 49 have identical shapes but their spacing increases along the length of the tape so that, as the tape is wound, the notches of each layer will register with those in adjacent layers to ultimately define equally spaced identical slots along the radial thickness of the annulus. By prepunching the tape as shown in FIG. 8, the final rotor body will have a lower loss than if the stator body had been machined to form the slots since smearing of the laminations is thereby avoided.

A suitable feeder control notching machine can be used to form the notches in the tape, as shown in FIG. 8, and will be controlled by calculating the exact distance which should be used between adjacent notches so that the notches will register with one another in the completed coil.

The prenotched tape of FIG. 8 can be wound in a winding jig of the type shown in FIGS. 6 and 7, having ribs 50 to 57 extending from a rear support surface 58. Ribs 50 to 57 correspond in angle to the angles between the slots 31 to 38 (FIG. 3) of the completed stator body. Thus, the tape of FIG. 8 can be wound simply by laying the notched tape onto corresponding ribs 50 to 57 as the tape coil is wound.

While the stator body is described as wound from a single strip of metal, it will be understood that this strip can have multiple plies of tape which are wound simultaneously, or the tapes may be continuous.

Figure 9:
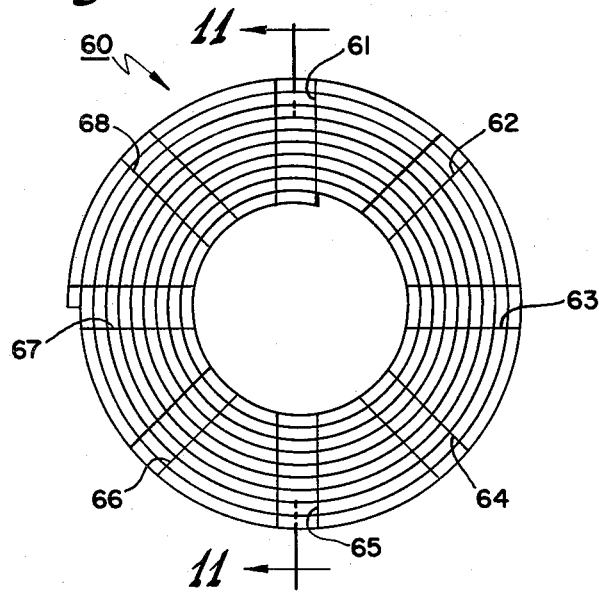
FIG. 9 is an elevation view of a coil of metal tape which may be used to form the rotor body for the electric machine of the invention.
Figure 11:
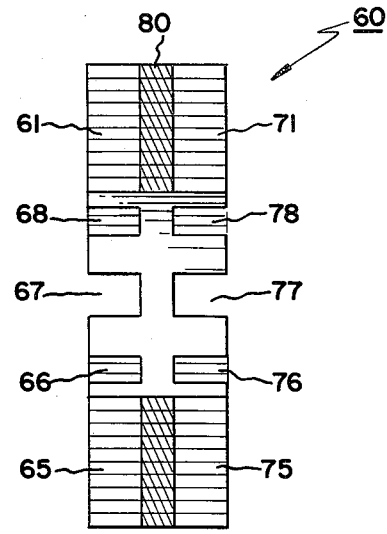
FIG. 11 is a cross-sectional view taken across the section line 11—11 in FIG. 9.
Figure 10:
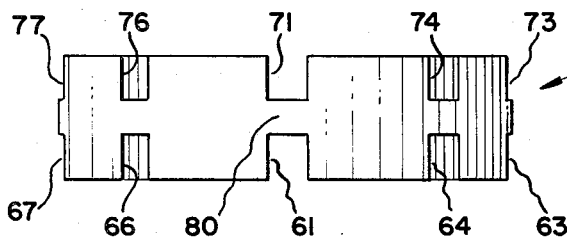
FIG. 10 is a top view of the rotor body of FIG. 9.

FIGS. 9 to 13 show the rotor of the present invention. As shown in FIGS. 9, 10 and 11, a rotor body is formed which, like the stator body of FIGS. 1 to 5, is comprised of a coil of one or more elongated thin metal tapes which form the rotor body 60. The tapes may conveniently be comprised of amorphous metal. Rotor body 60, like stator body 30, may have an inner diameter of 2 inches and can comprise about 1000 layers of tape having a thickness of about 0.002 inch and a width of about 1 inch to form an annular body having a radial thickness of about 2 inches. A plurality of slots 61 to 68 are then formed in at least one of the end faces of the coil 60 where these slots are identical in configuration and have a width of about 0.25 inch and depth of about 0.25 inch.

It should be noted that neither the rotor slots nor the stator slots are required to be rectangular in shape. Almost any type of slot shape may be employed. In fact, the slots may even be enclosed on all sides, if preferred. Moreover, the shape and number of rotor slots are normally not equal to those of the stator slots.

In the embodiment illustrated in FIGS. 9 to 13, a second identical set of slots is formed in the opposite side of the rotor body and includes the slots shown as slots 71, 74, 76, 77 and 78 which face their counterpart slots 61, 64, 66, 67 and 68, respectively. Thus there is an identical slot for each of the slots 61 to 69, the second set of slots having the same dimensions as the first set of slots.

The slots of each set have a depth which leaves a thin bridge of material 80, shown in FIGS. 10 and 11, which may have a thickness of about 0.020 inches. As will be later described, this forms, in effect, two independent rotors isolated from one another by the thin web 80. If web 80 is made sufficiently thin so that leakage flux will saturate it quickly, air gap flux will be able to travel between two stators, facilitating construction of a smaller, lighter motor with smaller core losses. Those skilled in the art will recognize that the motor of the present invention could, alternatively, be made with slots in only one side of the rotor body of FIGS. 9, 10 and 11.

Figure 12:
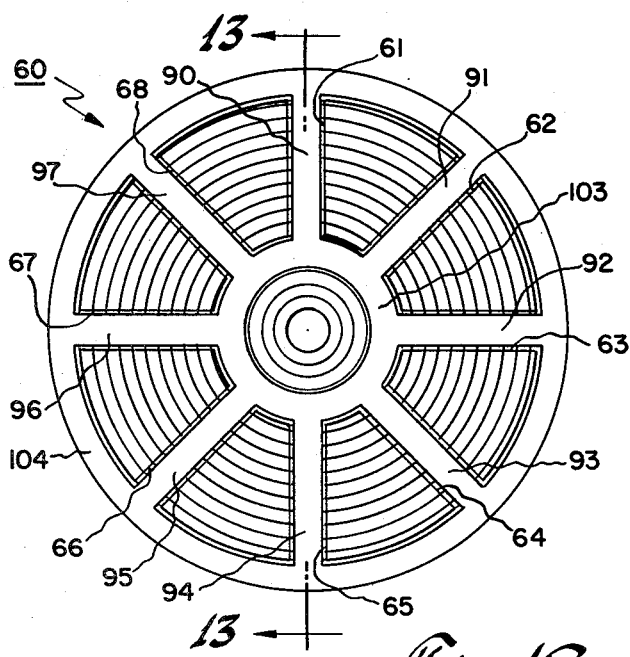
FIG. 12 is an elevation view similar to FIG. 9 of the wound rotor body with a squirrel cage type winding in place on the rotor body.
Figure 13:
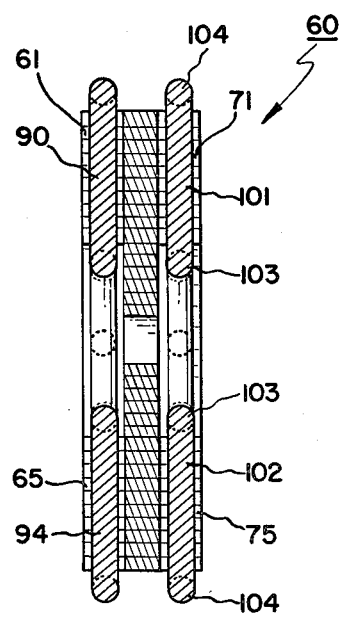
FIG. 13 is a cross-sectional view of the rotor of FIG. 12 taken across the section line 13—13 in FIG. 12.

By manufacturing the rotor body 60 of a coil of metal tape, such as, for example, a tape of amorphous metal, it becomes possible to make a squirrel cage type rotor for a disk type motor. Thus, when both sides of the rotor structure are slotted, as shown in FIGS. 9, 10 and 11, rotor bars can be placed in the slots and attached to conventional end rings to form the squirrel cage type of rotor construction. FIGS. 12 and 13 show rotor bars 90 and 97 disposed in slots 61 to 68, respectively. Similar equivalent rotor bars, shown in FIG. 13 as rotor bars 101 and 102, are disposed in slots 71 and 75, respectively, and other rotor bars are situated in the other rotor slots on the right-hand side of the rotor body in FIG. 13. These bars are connected to suitable end rings 103 and 104 to complete the squirrel cage type winding. The rotor bars and end rings may be integrally cast of aluminum, or may comprise separate conductors which are suitably connected together.

The slotted arrangement for rotor body 60 can be made in any desired manner, as by cutting slots into a previously wound coil. However, if desired, the ribbon forming the rotor body shown in FIG. 14 can be pre-notched with the notches 110 to 118, where the notches are spaced on increasingly larger centers to permit the notches to align with one another in succeeding coils to define the slots as previously described in connection with FIGS. 6, 7 and 8. Where slots are to be placed on both sides of the rotor body, a second set of notches, identical to the first set, may be formed in the opposite edge of the strip of metal tape as shown in FIG. 14.

Referring next to FIG. 15, there is illustrated a motor assembly which uses two identical stator bodies 30 disposed on opposite sides of the rotor body 60. Each of the stator bodies 30 includes a stator winding 40 (connected to input terminals 130 and 131) and each of the stator bodies 30 is fixed to the nested outer housing members 132 and 133, respectively, as by bolts 134–135 and 136–137, respectively. To complete the motor assembly, housing sections 132 and 133 are suitably joined together, as shown by the mechanical joint 140.

The rotor body 60 is provided with a central shaft 141 which is affixed to the rotor body through the continuation of the wound tape forming rotor body 60 radially-inward of the radially-innermost portion of end ring 104. Shaft 141 is received within bearings 143 and 144 which are supported from the housing halves 132 and 133, respectively, and the shaft 141 extends outwardly through the housing 133 as illustrated. The housing structure of FIG. 15 is schematic only, and other desired forms can be used to carry out one or more features of the present invention if preferred.

An important feature of the apparatus of FIG. 15 is that the motor is of a squirrel cage type but yet is in the disk form and facilitates use of a relatively short axial gap and the commercially available forms of metal tape.

The arrangement shown in FIG. 15 comprises two independent motors which are each single sided but are on the same shaft. The connection link between these two motors comprises the bridge 80 (FIGS. 10 and 11), which may be made thin enough to saturate quickly and cause flux to travel axially between the two stators 30. This results in a smaller and lighter motor with reduced core loss. Alternatively, the motor of FIG. 15 can be made using only a single one of the stators 30.

Motors constructed in accordance with the invention and as illustrated in FIG. 15 can be used in any desired motor applications, but are particularly advantageous when employed as direct wheel drive motors for electric vehicles or as a single motor drive for an electric vehicle.

Although only certain preferred features of this invention have been described, many variations and modifications will now be apparent to those skilled in the art, and it is therefore to be understood that the appended claims are intended to cover all such variations and modifications as fall within the true spirit of the invention.

What is claimed is:

1. An electrical machine comprising, in combination: a first ferromagnetic stator body; a ferromagnetic rotor body disposed adjacent said stator body and being rotatable with respect thereto, said rotor body and stator body being separated from one another by an air gap and being magnetically coupled to one another through said air gap;

said stator body comprising a coil of concentric turns of a thin elongated metal tape wound in the form of an annulus with a central opening;

said stator body annulus having first and second end surfaces, and a plurality of symmetrically distributed slots extending axially across at least a portion of the radial thickness of said first end surface and in a direction perpendicular to the layers of said tape and extending into said annulus for a predetermined depth;

first stator winding means wound in said slots;

said rotor body comprising a second coil of concentric layers of metal tape wound in the form of a second annulus, and a second plurality of symmetrically distributed slots, coordinated in number with the number of slots in said stator body, extending across at least a portion of the radial thickness of one end of said second annulus in a direction perpendicular to the layers of said second coil of tape and extending into said second annulus for a predetermined depth, said second coil of tape including a third plurality of slots disposed symmetrically with said second plurality of slots and extending into the opposite end of said rotor annulus, said second and third plurality of slots defining a thin, readily-saturable bridge between each opposed pair of slots thereof; and squirrel cage type winding means including radial winding sections disposed in said slots of said rotor body.

2. The machine of claim 1 wherein said elongated tape forming said rotor body has preformed notches of substantially equal size extending symmetrically into either side thereof to define said second and third slots respectively; said notches being spaced apart from each other along the length of said tape by a progressively increasing distance so as to cause registry of notches in successive and increasing diameter layers of said second tape.

3. The electrical machine of claim 1 wherein said tape comprises amorphous metal.

4. The electrical machine of claim 2 wherein said tape comprises amorphous metal.

5. An electrical machine comprising, in combination: a ferromagnetic stator body; a ferromagnetic rotor body disposed adjacent said stator body and being rotatable with respect thereto, said rotor body and stator body being physically separated from one another by an air gap and being magnetically coupled to one another through said air gap, said rotor body comprising a coil of concentric turns of a thin elongated metal tape wound in the form of an annulus having first and second end surfaces, said tape having preformed notches of substantially equal size extending perpendicularly into both edges of said tape so as to define a thin, readily-saturable bridge between the notches of each opposed pair of notches in said tape, said notches in each respective edge of said tape being spaced apart from each other along the length of said tape by a progressively increasing distance so as to cause registry of notches in successively increasing diameter layers of said tape and thereby form a plurality of symmetrically distributed slots extending axially across at least a portion of the radial thickness of said first end surface and of said second end surface in a direction perpendicular to the layers of said tape and extending into said annulus from each end surface for a predetermined depth; and first and second rotor windings, respectively, at least partly wound in said slots in said first and second end surfaces, respectively.

6. The machine of claim 5 including squirrel cage type winding means having radial winding sections disposed in said slots of said rotor body.

* * * * *